(12) United States Patent
Schroeder et al.

(10) Patent No.: US 12,333,812 B2
(45) Date of Patent: Jun. 17, 2025

(54) REFRIGERATOR APPLIANCE AND METHODS FOR TRACKING STORED ITEMS IN A FREEZER CHAMBER

(71) Applicant: Haier US Appliance Solutions, Inc., Wilmington, DE (US)

(72) Inventors: Michael Goodman Schroeder, Louisville, KY (US); Stephanos Kyriacou, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 561 days.

(21) Appl. No.: 17/713,721

(22) Filed: Apr. 5, 2022

(65) Prior Publication Data

US 2023/0316755 A1  Oct. 5, 2023

(51) Int. Cl.
| | |
|---|---|
| *G06K 9/00* | (2022.01) |
| *F25D 29/00* | (2006.01) |
| *G06T 7/50* | (2017.01) |
| *G06T 7/70* | (2017.01) |
| *G06V 20/50* | (2022.01) |

(Continued)

(52) U.S. Cl.
CPC ............ *G06V 20/50* (2022.01); *F25D 29/005* (2013.01); *G06T 7/50* (2017.01); *G06T 7/70* (2017.01); *G06V 20/68* (2022.01); *H04N 7/18* (2013.01)

(58) Field of Classification Search
CPC ........ G06V 20/52; G06V 20/20; G06V 20/68; G06V 10/454; G06V 10/764; G06V 10/82; G06V 2201/07; G06V 40/28; G06V 20/50; G06V 40/172; F25D 29/00; F25D 2500/06; F25D 2700/06; F25D 2700/04; F25D 29/005; F25D 23/12; F25D 2700/08; F25D 11/00; F25D 2400/361; F25D 25/02; F25D 25/025; F25D 2700/02

See application file for complete search history.

(56) References Cited

U.S. PATENT DOCUMENTS

| | | |
|---|---|---|
| 6,919,795 B2 | 7/2005 | Roseen |
| 10,785,456 B1 * | 9/2020 | Schroeder ............ H04N 23/661 |

(Continued)

FOREIGN PATENT DOCUMENTS

| | | |
|---|---|---|
| EP | 3819845 A1 | 5/2021 |
| JP | 6095551 B2 | 3/2017 |
| JP | 2019191797 A | 10/2019 |

*Primary Examiner* — Alex Kok S Liew
(74) *Attorney, Agent, or Firm* — Dority & Manning, P.A.

(57) ABSTRACT

A refrigerator appliance may include a cabinet, a freezer drawer, a camera module, and a controller. The freezer drawer may include a drawer body and a freezer door coupled to the drawer body to move therewith and provide selective access to a freezer chamber. The controller may be operably coupled to the camera module. The controller may be configured to initiate an operation routine. The operation routine may include initiating an image capture sequence at the camera module to capture one or more two-dimensional images, identifying a first stored item based on the one or more two-dimensional images of the image capture sequence, determining an internal location of the first stored item within the freezer drawer based on the one or more two-dimensional images of the image capture sequence, and recording a descriptor of the first stored item and the internal location of the first stored item.

19 Claims, 12 Drawing Sheets

(51) Int. Cl.
   *G06V 20/68*   (2022.01)
   *H04N 7/18*   (2006.01)

(56) References Cited

U.S. PATENT DOCUMENTS

| | | | |
|---|---|---|---|
| 2016/0021342 A1* | 1/2016 | Aso | H04N 7/183 |
| | | | 702/150 |
| 2016/0358508 A1* | 12/2016 | Cheatham, III | G06V 40/172 |
| 2018/0089973 A1* | 3/2018 | Kim | H04L 12/2818 |
| 2021/0049775 A1* | 2/2021 | Ryu | G06V 20/52 |

* cited by examiner

REFRIGERATOR APPLIANCE AND METHODS FOR TRACKING STORED ITEMS IN A FREEZER CHAMBER

FIELD OF THE INVENTION

The present subject matter relates generally to viewing and tracking items within a storage enclosure, such as within a freezer chamber of a refrigerator appliance.

BACKGROUND OF THE INVENTION

Storage enclosures, such as refrigerator appliances and pantries, generally provide an enclosed chamber for receiving multiple items or objects. For example, refrigerator appliances generally include a cabinet that defines a freezer chamber. A user can place food items or objects within the freezer chamber in order to hinder perishing of such food items. Thereby, a useable life of perishable items or objects can be increased.

Over time, a large volume or number of stored items (e.g., food items) can accumulate within the refrigerator's freezer chamber. As stored items accumulate, users of the refrigerator appliance can have difficulty identifying the items located within the refrigerator appliance. Additionally, user can also have difficulty determining a quantity of certain items within the refrigerator appliance. This is especially true when multiple users add/remove items from a common refrigerator appliance without communicating with other users. Consequently, the users may accidentally purchase additional items or more item than they desire. For example, certain food items do not readily perish within the freezer chamber, and such food items may be consumed infrequently. Thus, such food items can remain within the freezer chamber for extended periods of time. The users can forget about such food items or have trouble finding such items. It is possible that user may even purchase replacements despite already having acceptable items. In such a manner, the users can be inconvenienced or expend money needlessly. Additionally or alternatively, some users may be unaware that certain items have been removed or consumed. Thus, users may fail to replace or replenish such items.

Accordingly, a refrigerator appliance with features for assisting a user with viewing or tracking contents of a freezer chamber of the refrigerator appliance would be useful. In particular, a refrigerator appliance with features for assisting a user with viewing or tracking contents of a freezer chamber of the refrigerator appliance in order to establish an inventory of stored items positioned within the freezer chamber would be useful.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, a refrigerator appliance is provided. The refrigerator appliance may include a cabinet, a freezer drawer, a camera module, and a controller. The cabinet may define a freezer chamber. The freezer drawer may be slidably mounted to the cabinet at the freezer chamber. The freezer drawer may include a drawer body selectively received within the freezer chamber, and a freezer door coupled to the drawer body to move therewith and provide selective access to the freezer chamber. The camera module may be attached to the cabinet and directed toward the freezer chamber. The controller may be operably coupled to the camera module. The controller may be configured to initiate an operation routine. The operation routine may include initiating an image capture sequence at the camera module to capture one or more two-dimensional images, identifying a first stored item based on the one or more two-dimensional images of the image capture sequence, determining an internal location of the first stored item within the freezer drawer based on the one or more two-dimensional images of the image capture sequence, and recording a descriptor of the first stored item and the internal location of the first stored item.

In another exemplary aspect of the present disclosure, a method of operating refrigerator appliance is provided. The method may include initiating an image capture sequence at a camera module to capture one or more two-dimensional images. The method may further include identifying a first stored item and determining an internal location of the first stored item within a freezer drawer. Identifying the first stored item may be based on the one or more two-dimensional images of the image capture sequence. Determining the internal location of the first stored item may be based on the one or more two-dimensional images of the image capture sequence. The method may still further include recording a descriptor of the first stored item and the internal location of the first stored item.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
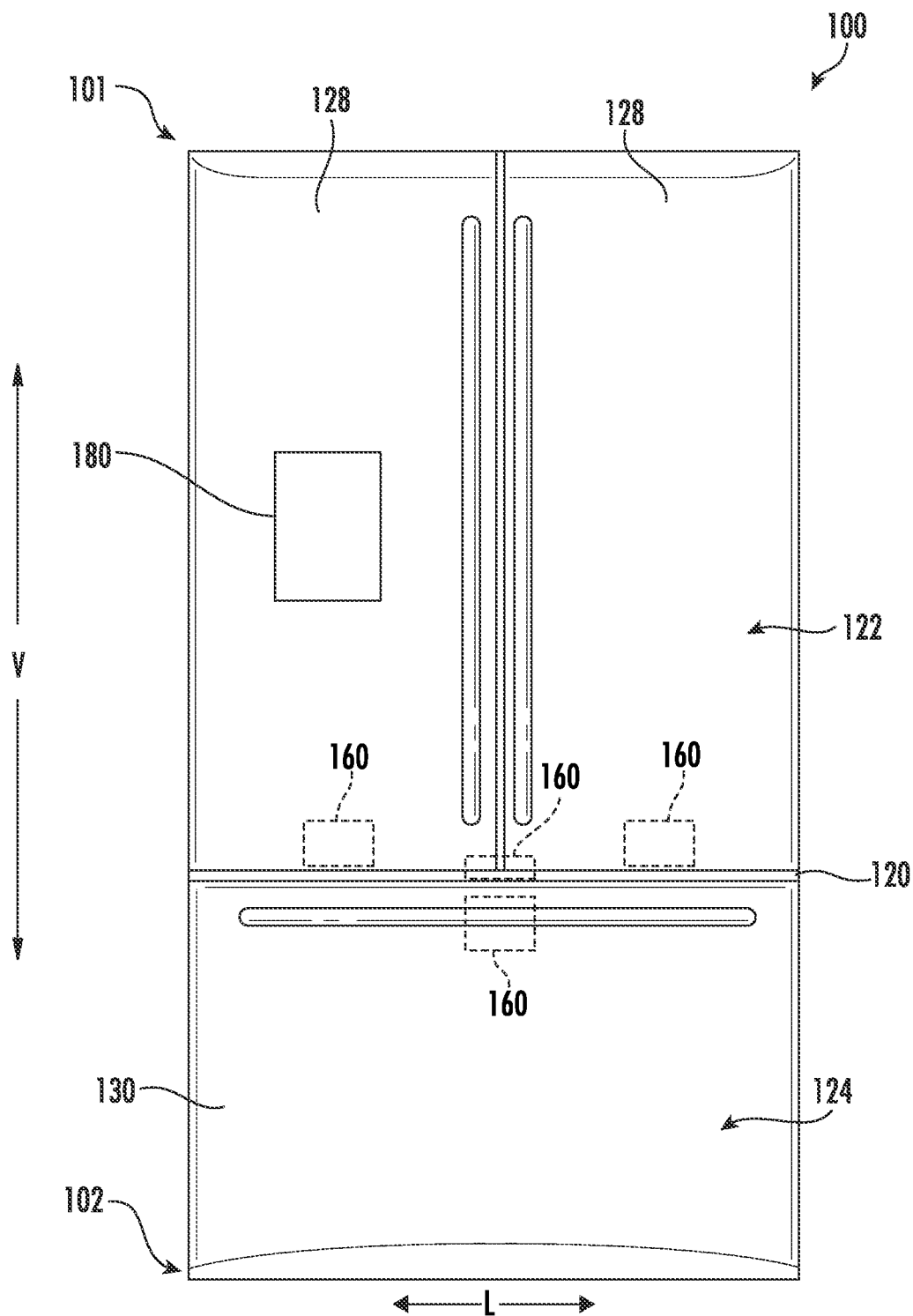
FIG. 1 provides a front elevation view of a refrigerator appliance according to exemplary embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the term "or" is generally intended to be inclusive (i.e., "A or B" is intended to mean "A or B or both"). The terms "first," "second," and "third" may be used interchangeably to distinguish one component from another and are not intended to signify location or importance of the individual components. Furthermore, as used herein, terms of approximation, such as "approximately," "substantially," or "about," refer to being within a ten percent margin of error.

Generally, the present disclosure provides system or methods to aid in managing an inventory for food items within a freezer chamber. For instance, methods may include one or more steps for automatically (e.g., without direct user input) detecting what items (i.e., stored items) are added or removed from a freezer chamber. The methods may also include one or more steps for detecting where items are within the storage enclosure. For instance, the methods may automatically identify a particular coordinate or position within a freezer drawer.

Figure 2:
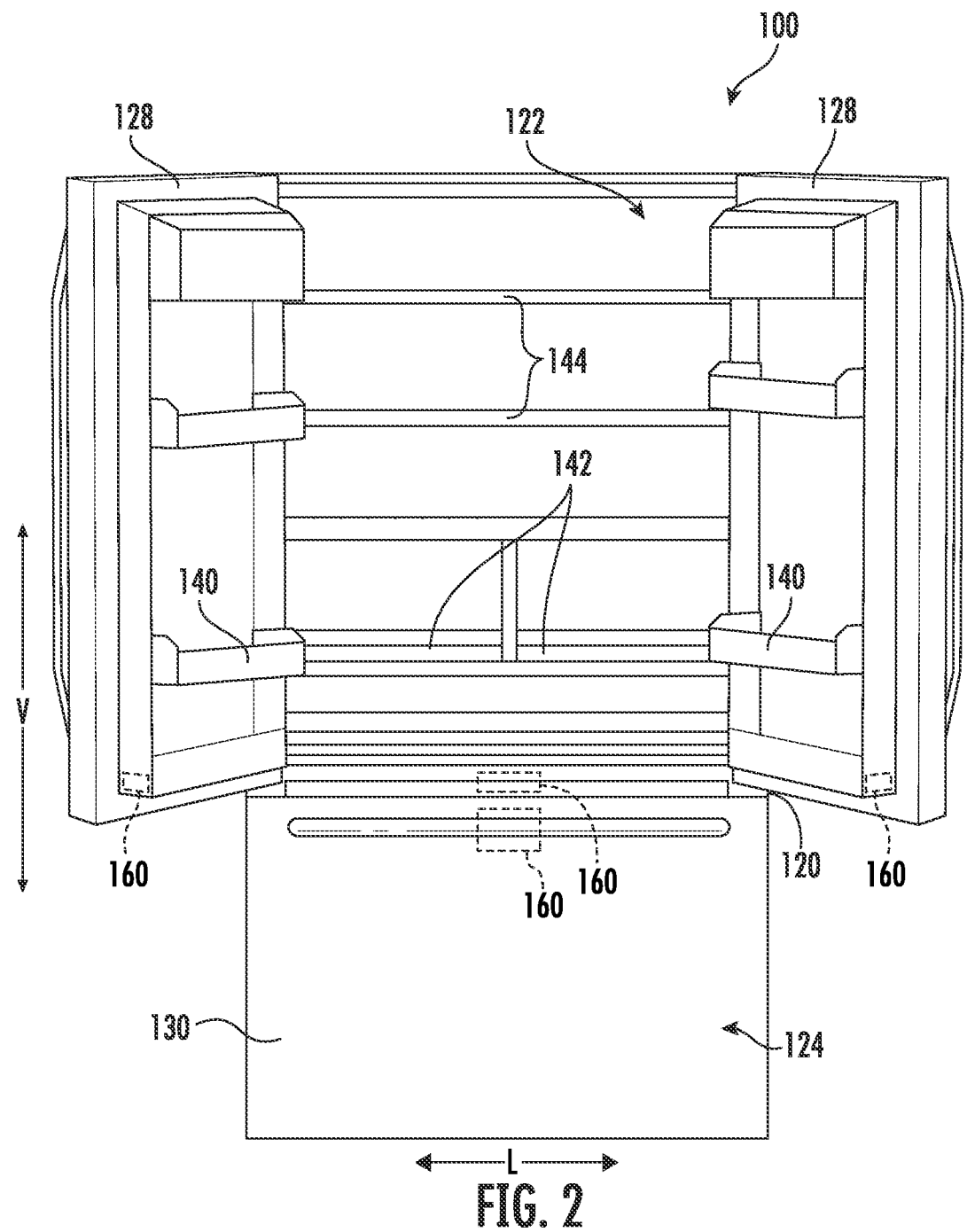
FIG. 2 provides a front elevation view of a refrigerator appliance according to exemplary embodiments of the present disclosure, wherein refrigerator doors are shown in an open position.

Turning now to the figures, FIG. 1 provides a front elevation view of a refrigerator appliance 100 according to exemplary embodiments of the present disclosure with refrigerator doors 128 of the refrigerator appliance 100 shown in a closed position. FIG. 2 provides a front view elevation of refrigerator appliance 100 with refrigerator doors 128 shown in an open position to reveal a fresh food chamber 122 of refrigerator appliance 100.

Refrigerator appliance 100 includes a cabinet or housing 120 that extends between a top 101 and a bottom 102 along a mutually orthogonal vertical direction V, a lateral direction L, and transverse direction T. Housing 120 defines chilled chambers for receipt of food items for storage. In particular, housing 120 defines fresh food chamber 122 positioned at or adjacent top 101 of housing 120 and a freezer chamber 124 arranged at or adjacent bottom 102 of housing 120. As such, refrigerator appliance 100 is generally referred to as a bottom mount refrigerator. Nonetheless, the description set forth herein is for illustrative purposes only and is not intended to be limiting in any aspect to any particular storage enclosure or refrigerator chamber configuration, except as otherwise indicated.

Figure 4:
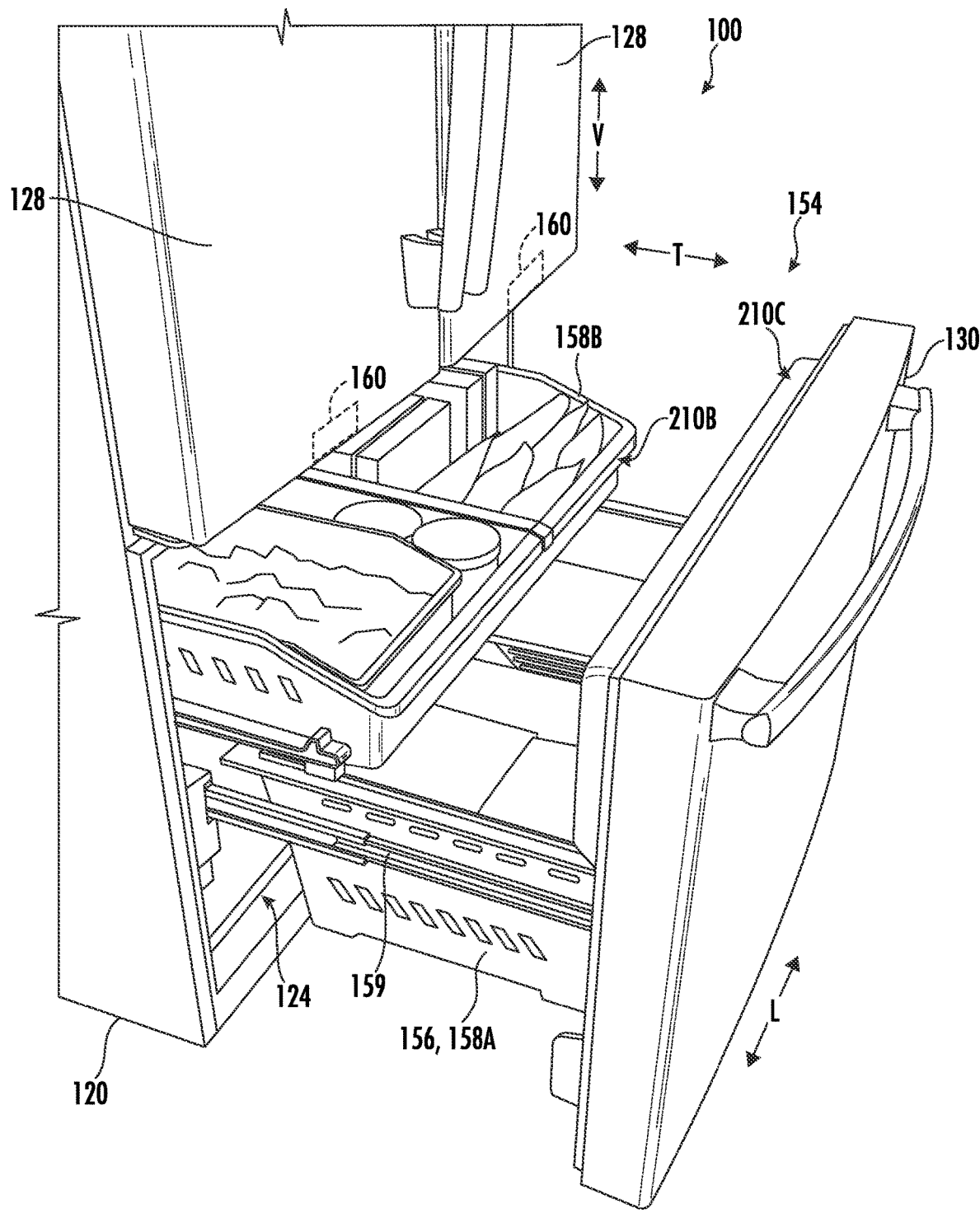
FIG. 4 illustrates a perspective view of a refrigerator appliance at the freezer drawer according to exemplary embodiments of the present disclosure.

Refrigerator door 128 are rotatably hinged to an edge of housing 120 for selectively accessing fresh food chamber 122. In addition, a freezer door 130 is arranged below refrigerator door 128 for selectively accessing freezer chamber 124. In some embodiments, a freezer drawer 154 is provided with freezer door 130 and is slidably mounted to the cabinet 120 at the freezer chamber 124. For instance, freezer door 130 may be coupled to a drawer body 156 that is selectively receiving within freezer chamber 124. Turning briefly to FIG. 4, freezer drawer 154 with door 130 is shown in an open position. As shown, freezer drawer 154 may include a sliding frame 159 166 that is mounted to cabinet 120 to slide along the transverse direction T for receipt within freezer chamber 124. In certain embodiments, a plurality of shelves or baskets 158A, 158B are mounted to sliding frame 159 or cabinet 120 to receive and store items within freezer chamber 124. For instance, drawer body 156 may include a lower basket 158A while a upper basket 158B may be independently movable (e.g., slidable along the transverse direction T) relative to lower basket 158A. In the illustrated embodiments, upper basket 158B is slidable along an upper rim of lower basket 158A. Freezer door 130 may be mounted (e.g., fixedly mounted) to sliding frame 159 such that sliding frame 159 may be actuated for synchronized movement with freezer door 130. In other words, sliding frame 159 may slide with freezer door 130 (e.g., as a user opens and closes freezer door 130). In some embodiments, a lower basket 158A is included with freezer drawer 154. For instance, lower basket 158A may be slidably mounted to cabinet 120 for receipt within freezer chamber 124. Optionally, lower basket 158A may be mounted (e.g., fixedly mounted) to sliding frame 159 such that lower basket 158A may be further actuated for synchronized movement with freezer door 130. In some such embodiments, lower basket 158A is positioned below a separate upper basket 158B within freezer chamber 124.

As discussed above, refrigerator doors 128 and freezer door 130 are shown in the closed configuration in FIG. 1, and refrigerator doors 128 are shown in the open position in FIG. 2. Freezer door 130 is shown in the open position in FIG. 4.

Turning now to FIG. 2, various storage components are mounted within fresh food chamber 122 to facilitate storage of food items therein as will be understood by those skilled in the art. In particular, the storage components include bins 140, drawers 142, and shelves 144 that are mounted within fresh food chamber 122. Bins 140, drawers 142, and shelves 144 are configured for receipt of stored items (e.g., beverages or solid food items) and may assist with organizing such food items. As an example, drawers 142 can receive fresh food items (e.g., vegetables, fruits, or cheeses) and increase the useful life of such fresh food items.

Refrigerator appliance 100 also includes features for assisting a user with identifying food items positioned within freezer chamber 124. The user can utilize such features, for example, to view food items stored within freezer chamber 124 or create an inventory of such food items. Such features are discussed in greater detail below.

Figure 3:
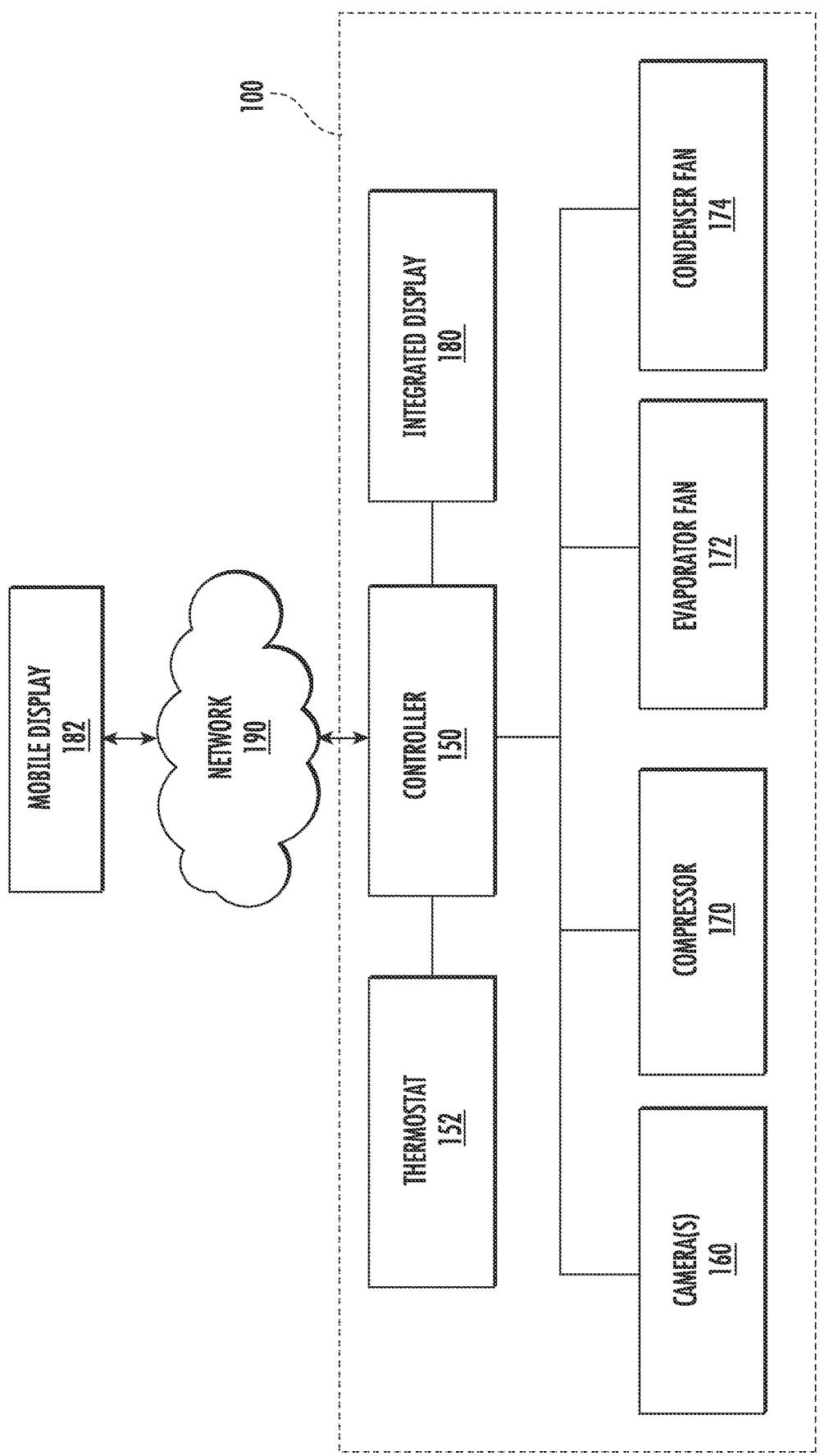
FIG. 3 provides a schematic view of a refrigerator appliance according to exemplary embodiments of the present disclosure.

FIG. 3 provides a schematic view of refrigerator appliance 100. Refrigerator appliance 100 includes a controller 150 that is operatively coupled or in communication with components of a refrigeration system (not shown) of refrigerator appliance 100 configured for cooling fresh food chamber 122 or freezer chamber 124. The components include a compressor 170, an evaporator fan 172, and a condenser fan 174. Controller 150 can selectively operate such components in order to cool fresh food chamber 122 or freezer chamber 124. Controller 150 is also in communication with a thermostat (e.g., a thermocouple or thermistor). The thermostat may be positioned in fresh food compartment 122 or freezer compartment 124 (FIG. 2). Controller 150 may receive a signal from the thermostat that corresponds to a temperature of fresh food compartment 122 or freezer compartment 124. Controller 150 may also include an internal timer for calculating elapsed time periods.

Controller 150 may include a memory and one or more microprocessors, CPUs or the like, such as general or special purpose microprocessors operable to execute programming instructions or micro-control code associated with operation of refrigerator appliance 100. The memory may represent random access memory such as DRAM, or read only memory such as ROM or FLASH. In some embodiments, the processor executes non-transitory programming instructions stored in memory. For certain embodiments, the instructions include a software package configured to operate appliance 100 or execute an operation routine (e.g., the exemplary methods 1300, 1400, and 1500 described below with reference to FIGS. 13 through 15). The memory may be a separate component from the processor or may be included onboard within the processor. Alternatively, controller 150 may be constructed without using a microprocessor (e.g., using a combination of discrete analog or digital logic circuitry; such as switches, amplifiers, integrators, comparators, flip-flops, AND gates, and the like) to perform control functionality instead of relying upon software.

Controller 150 may be positioned in a variety of locations throughout refrigerator appliance 100. Input/output ("I/O") signals may be routed between controller 150 and various operational components of refrigerator appliance 100. One or more components of refrigerator appliance 100 may be in operative communication (e.g., electric communication) with controller 150 via one or more conductive signal lines or shared communication busses. Additionally or alternatively, one or more components of refrigerator appliance 100 may be in operative communication (e.g., wireless communication) with controller 150 via one or more wireless signal bands.

Refrigerator appliance 100 also includes one or more cameras or camera modules 160. Each camera 160 may be any type of device suitable for capturing a two-dimensional picture or image, such as images illustrated in FIG. 7 (i.e., FIGS. 7A and 7B), FIG. 10 (e.g., 10-1), and FIG. 11 (e.g., 11-1). As an example, camera 160 may be a video camera or a digital camera with an electronic image sensor [e.g., a charge coupled device (CCD) or a CMOS sensor]. When assembled, each camera 160 is in communication (e.g., electric or wireless communication) with controller 150 such that controller 150 may receive a signal from camera 160 corresponding to the image captured by camera 160.

Generally, a camera 160 is attached to cabinet 120 (e.g., directly or, alternatively, indirectly, such as via door 128 or door 130). Moreover, camera 160 is directed toward freezer chamber 124. In some embodiments, a camera 160 is mounted directly to the cabinet 120. Specifically, camera 160 may be provided at a fixed location relative to cabinet 120 and, thus, remain stationary relative to the same. For instance, a camera 160 may be mounted to the horizontal mullion separating fresh food chamber 122 and freezer chamber 124. In additional or alternative embodiments, a camera 160 is mounted to the freezer door 130. Thus, camera 160 may slide relative to the cabinet 120. As shown, such a camera 160 may be mounted at a top portion of freezer door 130. For instance, camera 160 may be fixed to or directed through an upper portion of an inner wall above the upper basket 158B. In further additional or alternative embodiments, one or more cameras 160 are mounted to the refrigerator door 128. Thus, camera 160 may rotate relative to cabinet 120). As shown, such cameras 160 may be mounted at a bottom portion of a refrigerator door 128. For instance, a camera 160 may be fixed or directed through a bottom panel of door 128. Optionally, a discrete camera 160 may be provided at each door 128 and, notably, provide a combined field of view covering the entire width of freezer drawer 154.

When assembled, camera 160 may be directed (e.g., downwards) towards at least a portion of any particular one of or combination of drawer body 156 or baskets 158A, 158B. Thus, camera 160 can capture images of some or all of the storage area defined by freezer door 130.

In certain embodiments, refrigerator appliance 100 includes an integrated display 180. Integrated display 180 may be mounted on refrigerator door 128 (FIG. 1) or at any other suitable location on refrigerator appliance 100. Integrated display 180 is in operative communication with controller 150 such that integrated display 180 may receive a signal from controller 150 corresponding to an image captured by camera 160. Integrated display 180 can receive such signal from controller 150 and present the image to a user visually. Integrated display 180 may include, for example, a liquid crystal display panel (LCD), a plasma display panel (PDP), or any other suitable mechanism for displaying an image (e.g., a projector).

In additional or alternative embodiments, refrigerator appliance 100 includes a network interface (not shown) that couples refrigerator appliance 100 (e.g., controller 150) to a network 190 such that refrigerator appliance 100 can transmit and receive information over network 190. Network 190 can be any wired or wireless network such as a WAN, LAN, or HAN.

In some such embodiments, refrigerator appliance 100 (e.g., controller 150) is in communication with a mobile display 182 via network 190. Mobile display 182 can be any device configured to communicate over network 190 and display images received therefrom. For example, mobile display 182 may be a computer, a smartphone, or a tablet. Mobile display 182 is in communication with controller 150 such that mobile display 182 may receive a signal from controller 150 (via network 190) corresponding to a user interface or an image captured by camera 160. Mobile display 182 can receive such signal from controller 150 and present one or more images to a user visually. Mobile display 182 may include, for example, a liquid crystal display panel (LCD), a plasma display panel (PDP), or any other suitable mechanism for displaying an image (e.g., a projector). Mobile display 182 can also include an interface (e.g., tactile inputs, such as buttons, or a graphical user interface) that allows mobile display 182 to initiate communications with refrigerator appliance 100 over network 190.

During use, such as during an image capture sequence, camera 160 may capture one or more two-dimensional images (e.g., as a video feed or series of sequential static images) that may be transmitted to the controller 150 (e.g., as a data signal), as is generally understood. From the captured images, items (e.g., stored items, such as food, or non-stored items such as a user appendage, a basket, etc.) within the field of view for the camera 160 may be automatically identified by the controller 150. As is understood, recognizing or identifying such items, may be performed by edge matching, divide-and-conquer search, greyscale matching, histograms of receptive field responses, or another suitable routine (e.g., executed at the controller 150 based on one or more captured images from camera 160).

Figure 6:
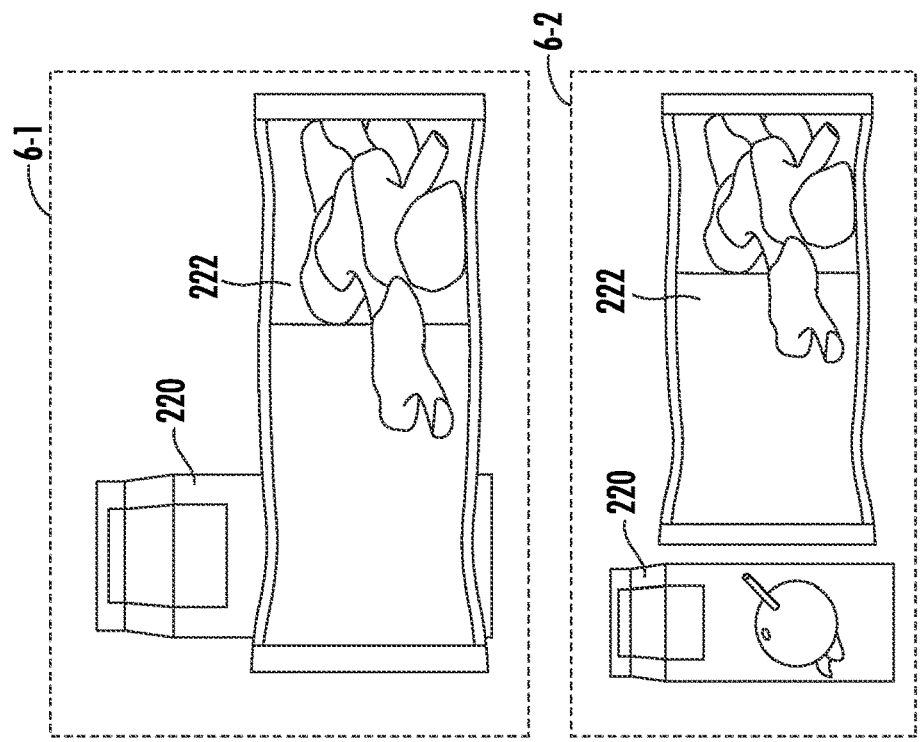
FIG. 6 illustrates a series of two-dimensional images of stored items on a shelf within a chilled chamber of a refrigerator appliance according to exemplary embodiments of the present disclosure.
Figure 7A:
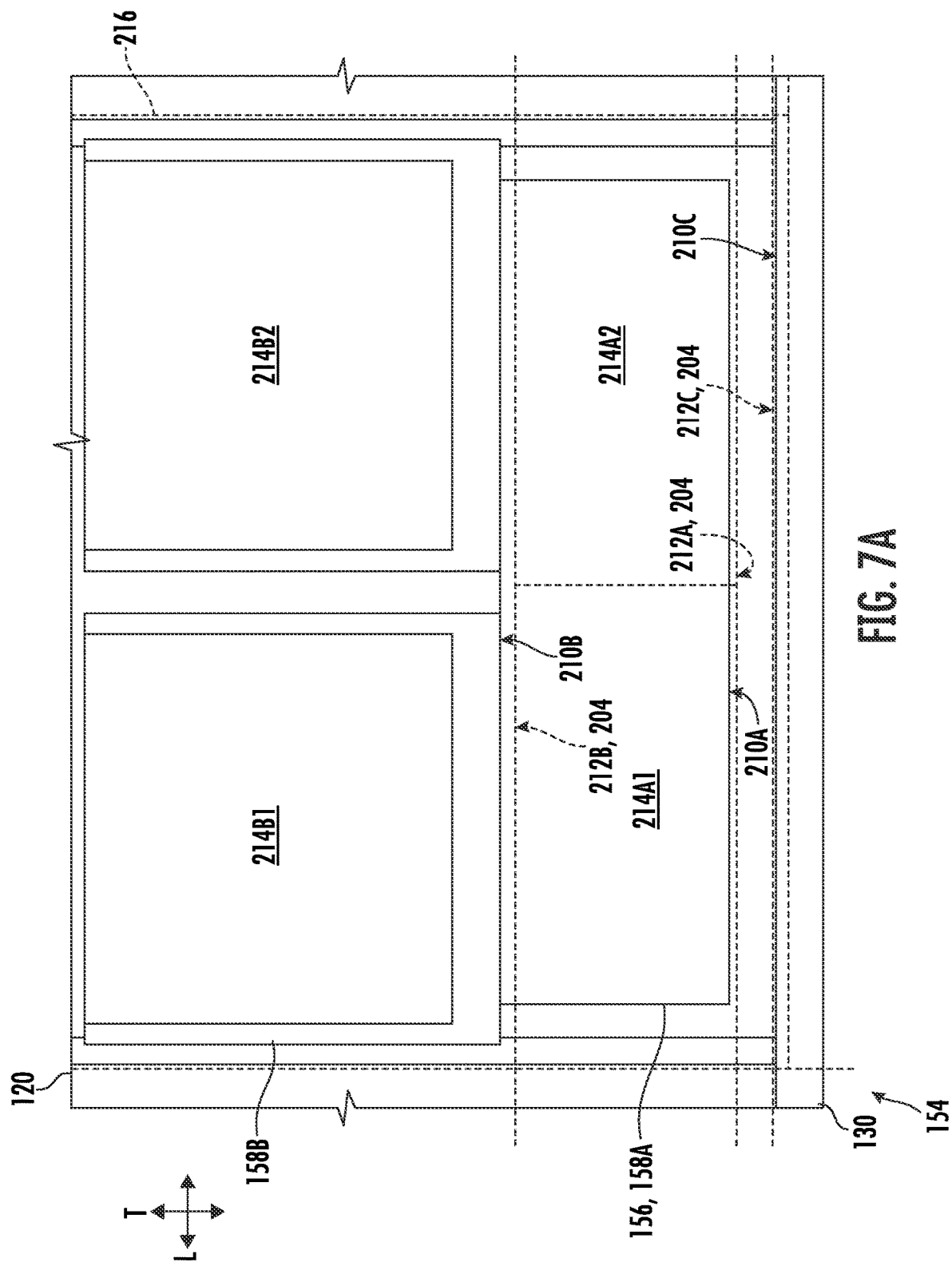
FIG. 7A illustrates an exemplary two-dimensional image of a drawer of a refrigerator appliance captured at a camera assembly of the refrigerator appliance according to exemplary embodiments of the present disclosure.
Figure 7B:
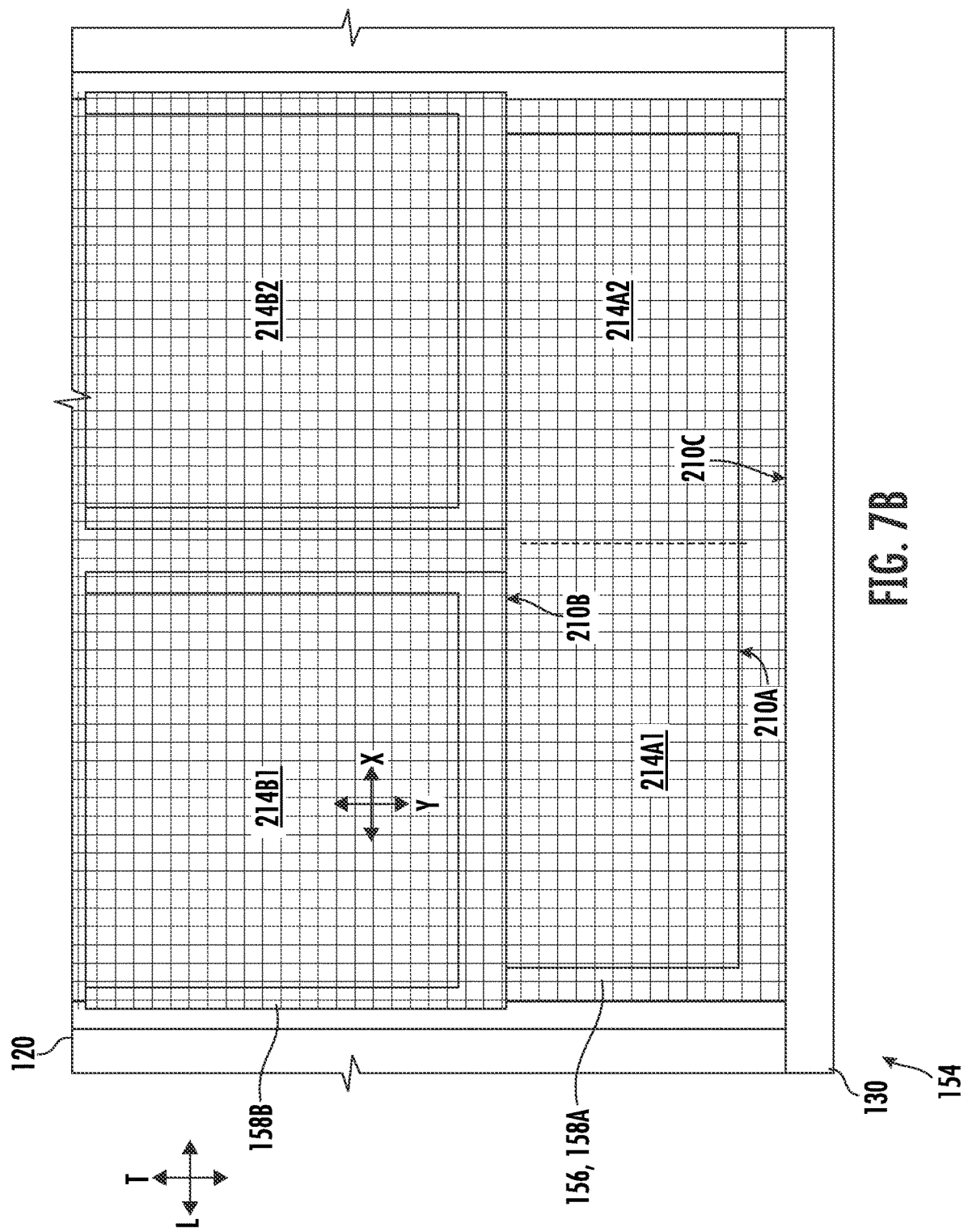
FIG. 7B illustrates an exemplary two-dimensional image of a drawer of a refrigerator appliance captured at a camera assembly of the refrigerator appliance according to exemplary embodiments of the present disclosure, with a coordinate system overlay.
Figure 8:
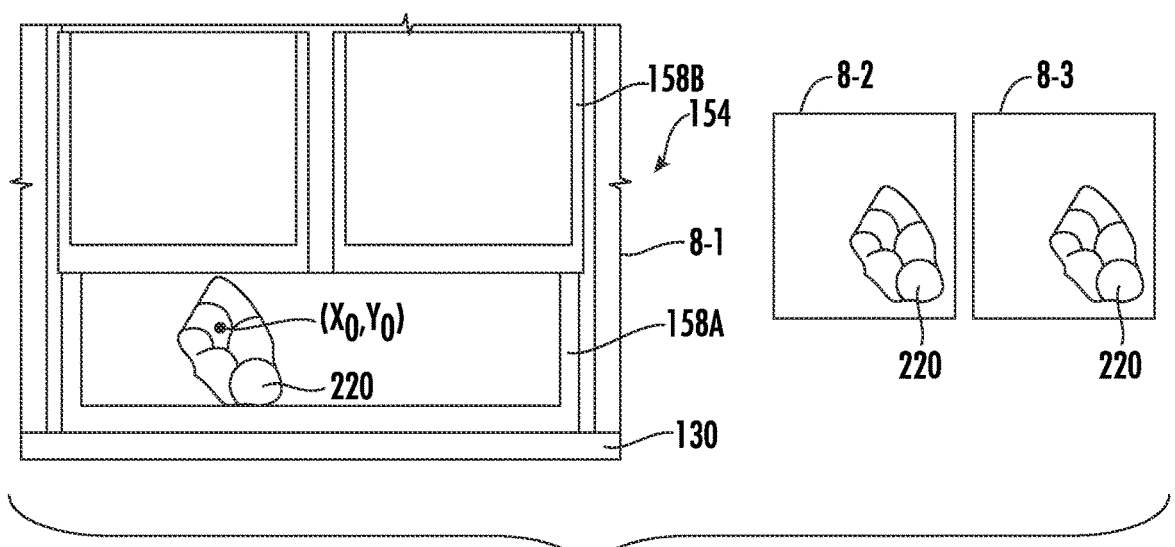
FIG. 8 illustrates a series of two-dimensional images of a stored item in a drawer of a refrigerator appliance according to exemplary embodiments of the present disclosure.

Turning now generally to FIGS. 4 through 12, FIG. 4 provides a perspective view of refrigerator appliance 100 and freezer drawer 154 (e.g., in an open position), and FIG. 7 (i.e., FIGS. 7A and 7B) illustrates a possible field of view for camera 160 directed toward a freezer drawer 154 or freezer chamber 124. FIGS. 5, 6, and 8 through 11 illustrate various exemplary two-dimensional images related to drawer storage, such as might be captured at one or more cameras 160 (FIG. 2), viewed at integrated display 180 (FIG. 3), or viewed at mobile display 182 (FIG. 3). In particular, FIGS. 5, 6, and 8 through 11 illustrate a separate series of exemplary two-dimensional images that might be viewed at display 180 or 182 after being isolated or generated from an initial image captured at camera 160 as part of an image capture sequence.

In certain embodiments, camera 160 and controller 150 are configured to capture multiple, sequential, two-dimensional images (e.g., at a predetermined rate or pattern) as part of an image capture sequence. Sequential images (e.g., a previously-captured image and a more-recently-captured image) may be recorded (e.g., temporarily) and compared at the controller 150. From the comparison, changes or differences between sequential images may be detected. In some embodiments, the image capture sequence is prompted or initiated in response to detected movement at a freezer drawer 154. The image capture sequence may subsequently be stopped or halted according to one or more end conditions, such as expiration of a predetermined time period, failure to detect further changes in sequential images, or closing of the door 128.

As shown generally in FIGS. 4 and 7, at least a freezer drawer 154 may be visible within the field of view for camera 160 (FIG. 2). Specifically, one or more portions of drawer body 156, lower basket 158A, or upper basket 158B may be within the field of view for one or more cameras 160 (FIG. 2). Additionally or alternatively, one or more portion of freezer door 130 may be within the field of view for one or more cameras 160. For instance, a front edges 212A, 212B of the baskets 158A, 158B may be within the field of view for one or more cameras 160. Each front edge 212A, 212B may represent the forwardmost surface of a corresponding basket 158A, 158B, which may be the basket's surface most proximal to the freezer door 130. For example, front edge 212A corresponds to lower basket 158A while front edge 212B corresponds to upper basket 158B. Additionally or alternatively, an inner edge 212C of freezer door 130 may be within the field of view for one or more cameras 160. For example, the inner edge 212C of freezer door 130 may represent the inner surface 210C of freezer door 130, which is generally directed inward toward freezer chamber 124 (e.g., to delineate or close the same when freezer door 130 is in the closed position).

In certain embodiments, controller 150 is configured to identify a fiducial marker or region of freezer drawer 154 (e.g., the drawer body 156, lower basket 158A, upper basket 158B, or freezer door 130) based on signals or images received from the camera 160 (e.g., during an image capture sequence). In some embodiments, a predefined fiducial region 204 provides a reference point or line for an horizontal coordinate grid or system 202. Optionally, the horizontal coordinate system 202 may include a horizontal X axis (e.g., parallel to the lateral direction L) and a horizontal Y-axis (e.g., parallel to the transverse direction T). Thus, the controller 150 may be able to generate or identify the horizontal coordinate system 202 from, with respect to, or otherwise based on identification of a predefined fiducial region 204. Using this horizontal coordinate system 202, controller 150 may be able to determine where within the freezer drawer 154 an item is located. In the exemplary embodiment of FIG. 7, the fiducial region 204 is provided at the inner edge 212C of freezer door 130. Nonetheless, it is understood that any other suitable region or regions may be used.

Separately from or in addition to the horizontal coordinate system 202, a vertical coordinate system may be generated or identified. from the two-dimensional images captured from one or more cameras 160, the controller 150 may identify a fiducial edge 212A, 212B of one or more of the baskets 158A, 158B. Optionally, a corresponding fiducial edge 212A, 212B may be identified for each basket 158A, 158B. Additionally or alternatively, one or more fiducial edges 212A, 212B may be used to establish the vertical coordinate system within freezer drawer 154. Using this vertical coordinate system, controller 150 may be able to determine what basket 158A, 158B at what relative height an item is disposed. Such a relative height, may be determined, for instance, as a Z-axis vertical depth.

Figure 5:
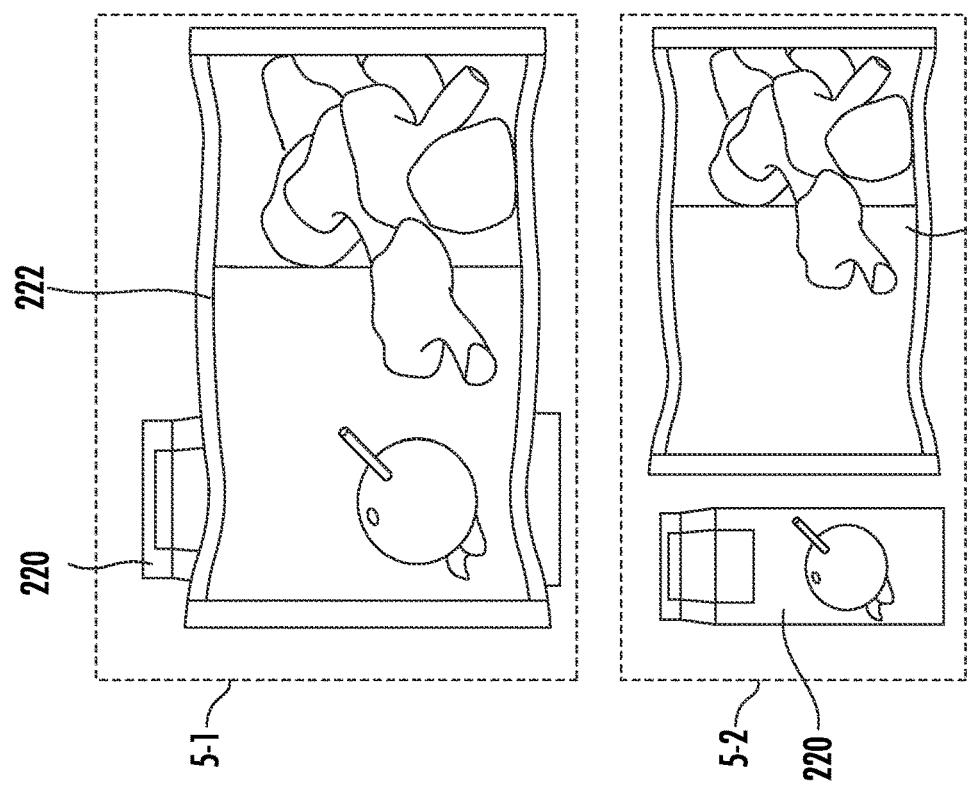
FIG. 5 illustrates a series of two-dimensional images of stored items on a shelf within a chilled chamber of a refrigerator appliance according to exemplary embodiments of the present disclosure.

Turning especially to FIGS. 5 and 6, in additional or alternative embodiments, controller 150 is configured to identify one or more stored items (e.g., during an image capture sequence). For instance, from the two-dimensional images captured from the camera 160, the controller 150 may identify one or more stored items (e.g., 220, 222) being added to or removed from of one or more of the baskets 158A, 158B. Generally, controller 150 may be configured to initiate or execute an object-recognition sequence or algorithm to identify certain objects, as is understood. Optionally, controller 150 may recognize one or more stored items based on a sub-portion (i.e., less than the entirety) of the two-dimensional profile of the corresponding object. Thus, the controller 150 may calibrate portions of captured two-dimensional images to infer portions of one or more stored items that are hidden, blurred, or otherwise not visible in a captured two-dimensional image.

As an example, and as noted above, FIGS. 5 and 6 illustrate a series of exemplary two-dimensional images that might be viewed at display 180 or 182 after being isolated or generated from an initial image captured at camera 160 as part of an image capture sequence. Specifically, two-dimensional image 5-1 illustrates a pair of stored items 220, 222 captured while being placed into freezer drawer 154. Two-dimensional image 5-2 illustrates an expanded image that has been generated (e.g., by controller 150 from two-dimensional image 5-1) and provides a first stored item 220 (e.g., frozen juice) spaced apart from a second stored item 222 (e.g., frozen vegetables). Similarly, two-dimensional image 6-1 illustrates a pair of stored items 220, 222 captured while being placed into fresh food chamber 122 (e.g., after a portion of the second stored item 222 has been removed from the remaining portion thereof). Two-dimensional image 6-2 illustrates an expanded image that has been generated (e.g., by controller 150 from two-dimensional image 6-1) and provides the first stored item 220 spaced apart from a second stored item 222.

Although the second stored item 222 partially blocks or covers the first stored item 220 such that only a sub-portion of the first stored item 220 is visible in the captured images, the controller 150 may identify the first stored item 220 (e.g., as well as the second stored item 222). The remaining or blocked portion of the first stored item 220 may be inferred.

In certain embodiments, controller 150 may be configured to record a descriptor of the identified stored items (e.g., within an inventory of stored items detected within refrigerator appliance 100). As an example, the descriptor may include a string of text naming or generally describing the corresponding stored item. As an additional or alternative example, the descriptor may include an image corresponding to the stored item. Such an image of the descriptor may be a captured image (or portion thereof) from camera 160 or, alternatively, a preloaded image received from another remote source (e.g., a remote server). If provided as a preloaded image, the descriptor may provide an image of a substantially identical item. For example, if the stored item is identified as a container of frozen juice, the descriptor may provide a preloaded image of another (e.g., generic) container of juice that would be easy for a user to visually distinguish or recognize.

Optionally, an expanded two-dimensional image (e.g., 5-2 or 6-2) may be generated showing the stored items spaced apart from each other such that a user may readily understand what stored items have been captured and identified. Such expanded images may be generated using portions of the captured two-dimensional images at the camera 160 (e.g., wherein captured portions of the stored items are isolated from each other and transferred to the expanded image) or from separate preloaded images stored or received at the controller 150 (e.g., wherein preloaded images of similar items are received from a remote server, such as an Internet server, and transferred to the expanded image).

Images for object recognition may be captured separate from or in addition to images capturing item identification. For instance, the position of one or more portions of drawer body 156 or items relative to the remaining portions of drawer body 156—or a fiducial region 204 thereof. In some embodiments, one or more determinations may be made (e.g., at controller 150) based on the order in which stored items or a portion of basket 158A or 158B are recognized. As an example, if a stored item is recognized or identified (e.g., during an image capture sequence) in a previously-captured image while a portion of a basket (e.g., upper basket 158B), controller 150 may determine the stored item is being placed within a particular portion of the freezer drawer 154. Optionally, the internal location or shelf 144 at which the stored item is placed may be recorded (e.g., with or in addition to the corresponding descriptor of the stored item). The internal location may be recorded, for instance, as an X-Y coordinate, Z-axis depth, three-dimensional coordinate (e.g., X-Y-Z coordinate), or a generalized descriptor (e.g., upper basket left side 214B1, upper basket right side 214B2, lower basket left side 214A1, or lower basket right side 214A2).

As an additional or alternative example, if a stored item is identified in a previously-captured image while the stored item is unable to be identified in a more-recently captured image (e.g., while a determination is made of no relative movement between a higher basket between the two images), controller 150 may determine the stored item is being removed from freezer drawer.

In certain embodiments, camera 160 and controller 150 are configured to capture multiple, sequential, two-dimensional images (e.g., at a predetermined rate or pattern) as part of an image capture sequence. Sequential images (e.g., a previously-captured image and a more-recently-captured image) may be recorded (e.g., temporarily) and compared at the controller 150. From the comparison changes or differences between sequential images may be detected. In some embodiments, the image capture sequence is prompted or initiated in response to detected movement within, or forward, from a chilled chamber (e.g., fresh food chamber 122). The image capture sequence may subsequently be stopped or halted according to one or more end conditions, such as expiration of a predetermined time period, failure to detect further changes in sequential images, or closing of the door 130.

In certain embodiments, controller 150 is configured to identify an opened state of door 130 based on signals or images received from the camera 160 (e.g., during an image capture sequence). For instance, from the two-dimensional images captured from the camera 160, the controller 150 may identify the freezer drawer 154 (or a predetermined portion thereof) has been positioned within a predetermined bounding zone 216 of the field of view of camera 160. In some such embodiments, the predetermined bounding zone 216 establishes a two-dimensional footprint or region that is fixed relative to one or more cameras 160 or cabinet 120 (e.g., forward from at least a portion of cabinet 120). Generally, the predetermined bounding zone 216 may establish door 130 is no longer closed and is at least partially open to permit insertion or removal of stored items. As an example, in the illustrated image of FIG. 7, freezer drawer 154 is received within the predetermined bounding zone 216. Thus, it may be determined that the freezer drawer 154 is open or otherwise in an opened state such that items may pass to/from the storage area of freezer drawer 154.

Turning especially to FIGS. 8 through 11, in additional or alternative embodiments, controller 150 is configured to identify one or more stored items (e.g., during an image capture sequence). For instance, from the two-dimensional images captured from the camera 160, the controller 150 may identify one or more stored items being added to or removed from freezer drawer 154 (e.g., as such stored items pass to/from the predetermined bounding zone 216 216). Generally, controller 150 may be configured to initiate or execute an object-recognition sequence or algorithm to identify certain objects, as is understood. Optionally, controller 150 may recognize one or more stored items based on a sub-portion (i.e., less than the entirety) of the two-dimensional profile of the corresponding object. Thus, the controller 150 may calibrate portions of captured two-dimensional images to infer portions of one or more stored items that are hidden, blurred, or otherwise not visible in a captured image. Additionally or alternatively, and as will be further described below, controller 150 may determine or select a layer at which the items are placed within the freezer drawer 154 (e.g., separate from or in addition to determination of which basket 158A or 158B the items are placed in).

As an example, and as noted above, FIGS. 8 through 11 illustrate a series of exemplary two-dimensional images that might be viewed at display 180 or 182 after being isolated or generated from an initial image captured at camera 160 as part of an image capture sequence. Specifically, FIGS. 8 through 11 illustrate various two-dimensional captured images of stored items identified within the freezer drawer 154, two-dimensional isolated images of identified stored items within selected vertical layers of the freezer drawer 154, and two-dimensional expanded images of all corresponding identified stored items within freezer drawer 154.

Generally, FIGS. 8 through 11 illustrate an exemplary progression of stored items being placed within freezer drawer 154. Each of FIGS. 8 through 11 may be understood to illustrate, for example, additional stored items being placed within freezer drawer 154 during a corresponding image capture sequence. For instance, turning especially to FIG. 8, two-dimensional image 8-1 illustrates a first stored item 220 (e.g., a bag of frozen rolls) captured within freezer drawer 154 (e.g., at a particular coordinate position) while freezer drawer 154 is in the predetermined bounding zone 216 216. Two-dimensional image 8-2 illustrates a two-dimensional isolated image that has been generated (e.g., by controller 150 from two-dimensional image 8-1) to show an isolated first layer within which the first stored item 220 is held. Two-dimensional image 8-3 illustrates a two-dimensional expanded image that has been generated (e.g., by controller 150 from two-dimensional image 8-2) to show all of the stored items within freezer drawer 154 at image 8-1 (i.e., first stored item 220).

Figure 9:
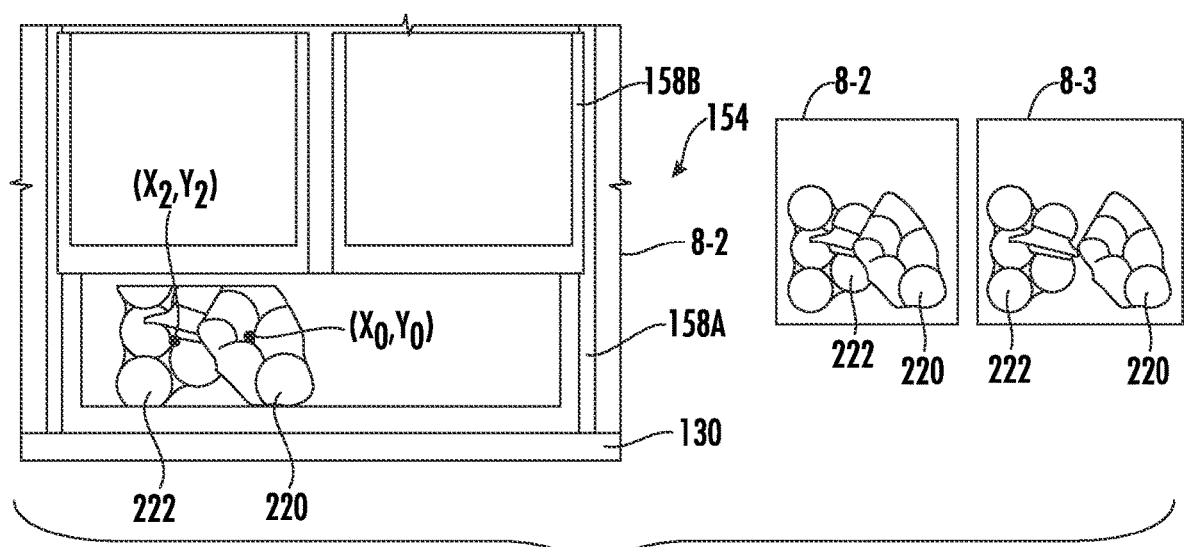
FIG. 9 illustrates a series of two-dimensional images of stored items in a drawer of a refrigerator appliance according to exemplary embodiments of the present disclosure.

Turning especially to FIG. 9, two-dimensional image 9-1 illustrates the first stored item 220 and a second stored item 222 (e.g., a bag of frozen biscuits) captured within freezer drawer 154 (e.g., at a particular coordinate position subsequent to 8-1) while freezer drawer 154 is in the predetermined bounding zone 216 216. Two-dimensional image 9-2 illustrates a two-dimensional isolated image that has been generated (e.g., by controller 150 from two-dimensional image 9-1) to show an isolated first layer within which the first stored item 220 and second stored item 222 are held. Two-dimensional image 9-3 illustrates a two-dimensional expanded image that has been generated (e.g., by controller 150 from two-dimensional image 9-2) to show all of the stored items within freezer drawer 154 at image 9-1 (i.e., first stored item 220 and second stored item 222) spaced apart from each other.

Figure 10:
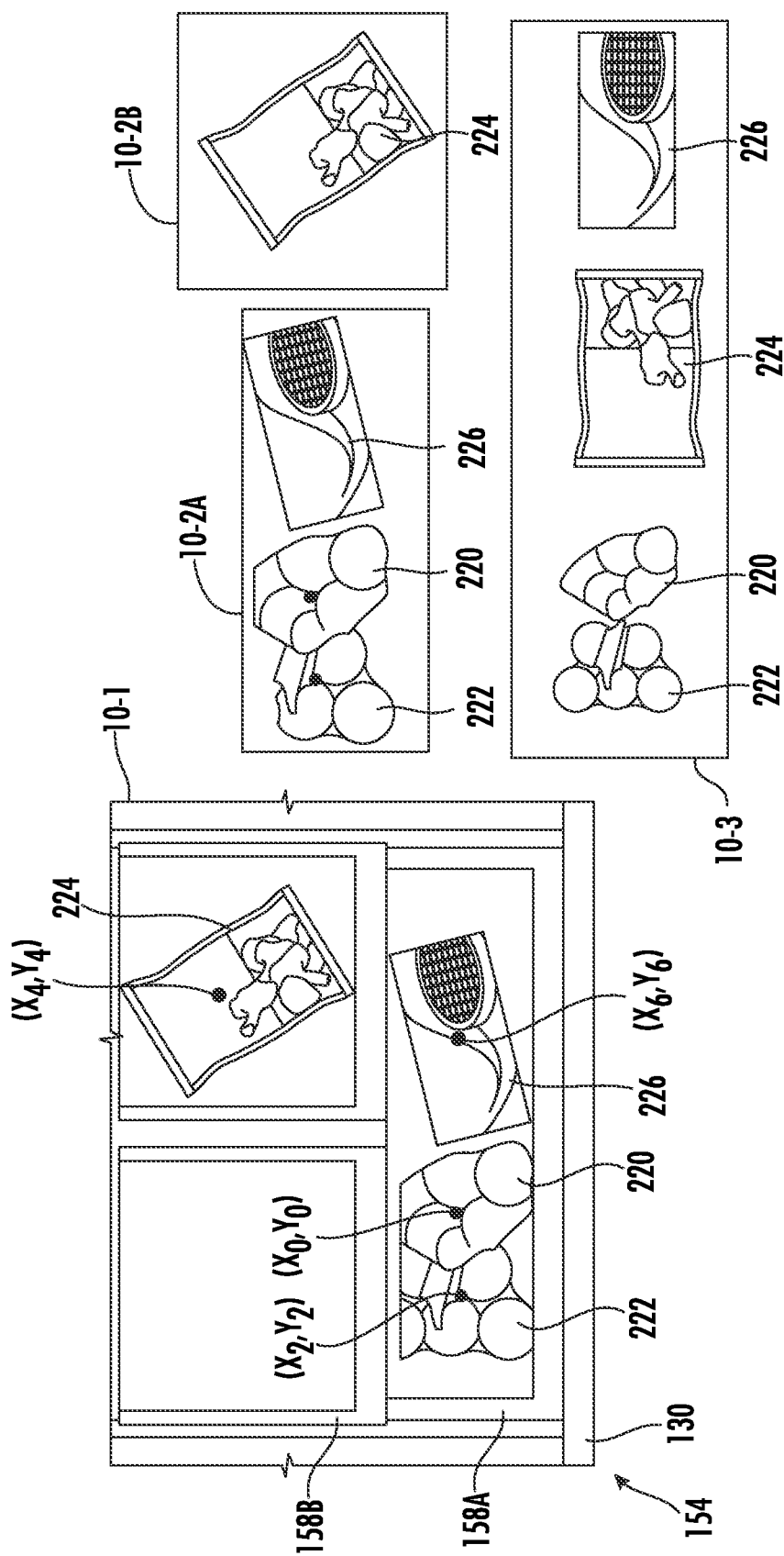
FIG. 10 illustrates a series of two-dimensional images of stored items in a drawer of a refrigerator appliance according to exemplary embodiments of the present disclosure.

Turning especially to FIG. 10, two-dimensional image 10-1 illustrates the first stored item 220, the second stored item 222, a third stored item 224 (e.g., a bag of frozen vegetables), and a fourth stored item 226 (e.g., a box of frozen waffles), captured within freezer drawer 154 (e.g., subsequent to 9-1) while freezer drawer 154 is in the predetermined bounding zone 216 216. Two-dimensional image 10-2A illustrates a two-dimensional isolated image that has been generated (e.g., by controller 150 from two-dimensional image 10-1 or 9-2) to show an isolated first layer within which the first stored item 220, second stored item 222, and fourth stored item 226 are held (e.g., within the lower basket 158A). Two-dimensional image 10-2B illustrates a two-dimensional isolated image that has been generated (e.g., by controller 150 from two-dimensional image 10-1) to show an isolated second layer within which the third stored item 224 is held (e.g., within the upper basket 158B). Two-dimensional image 10-3 illustrates a two-dimensional expanded image that has been generated (e.g., by controller 150 from two-dimensional images 10-2A and 10-2B) to show all of the stored items within freezer drawer 154 at image 10-1 (i.e., first stored item 220, second stored item 222, fourth stored item 226, and third stored item 224) spaced apart from each other.

Figure 11:
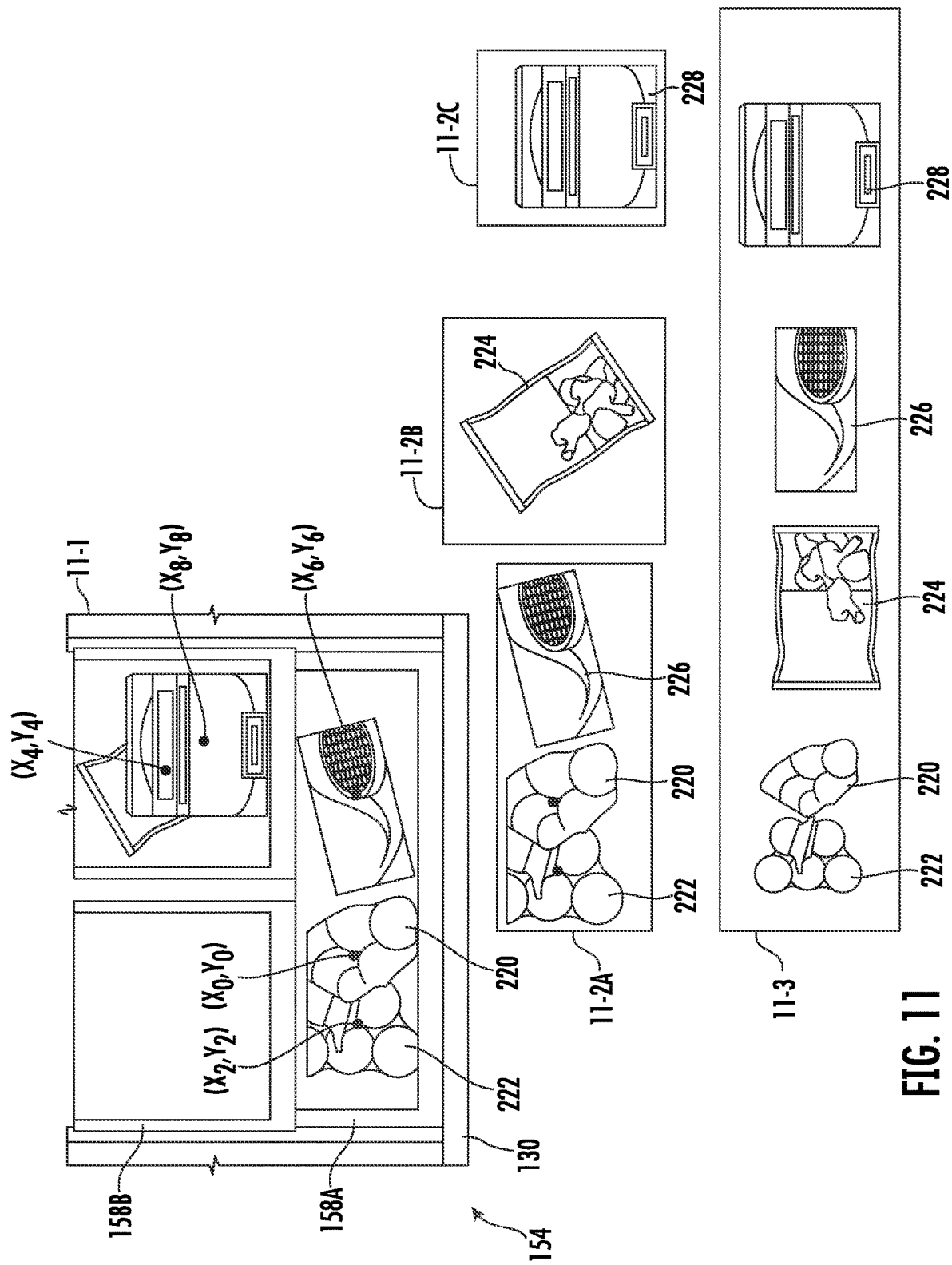
FIG. 11 illustrates a series of two-dimensional images of stored items in a drawer of a refrigerator appliance according to exemplary embodiments of the present disclosure.
Figure 12:
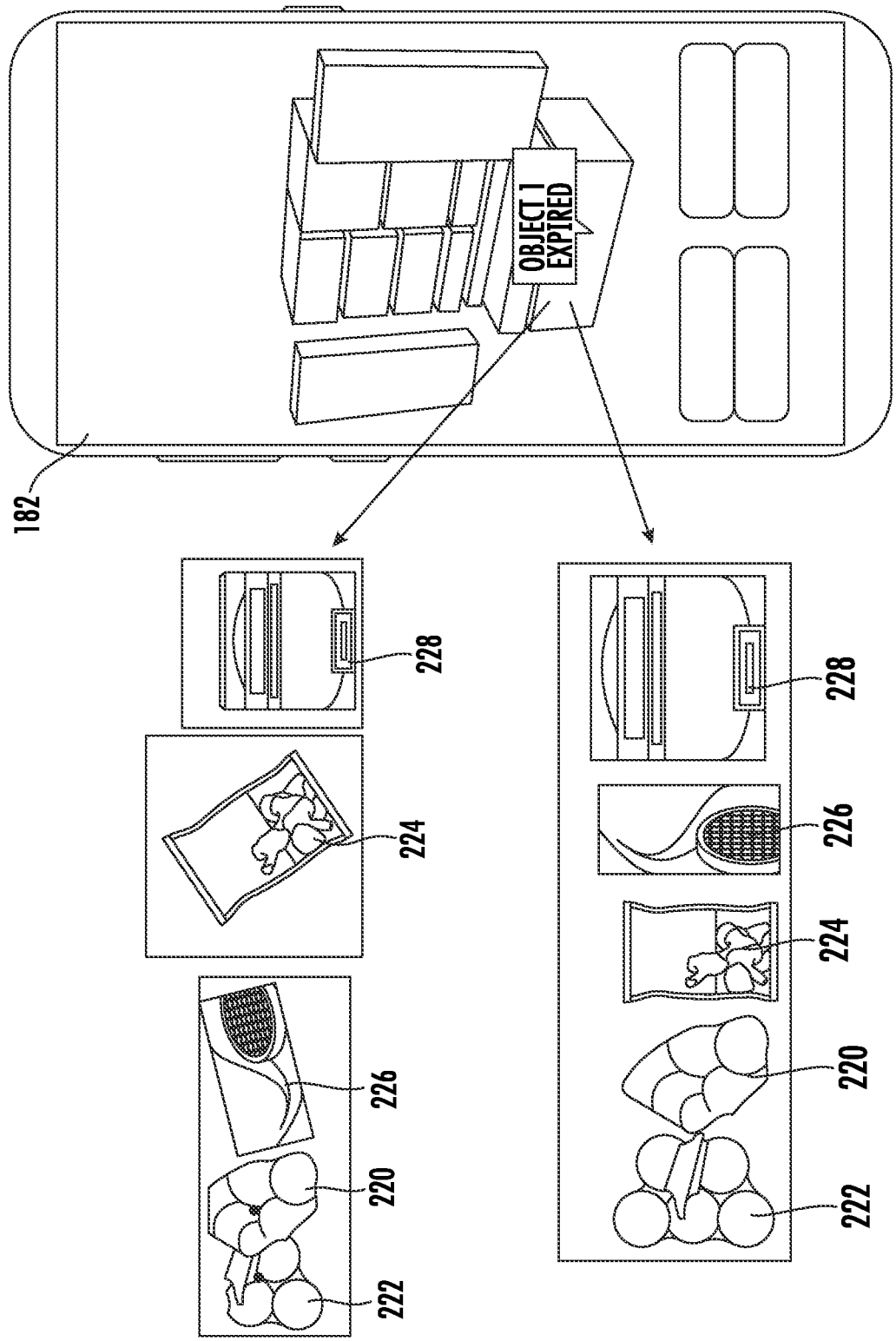
FIG. 12 illustrates a schematic view of two-dimensional images of stored items in a drawer of a refrigerator appliance viewable on a mobile display according to exemplary embodiments of the present disclosure.

Turning especially to FIG. 11, two-dimensional image 11-1 illustrates the first stored item 220, the second stored item 222, the third stored item 224, the fourth stored item 226, and a fifth stored item 228 (e.g., a frozen pizza) captured within freezer drawer 154 (e.g., subsequent to 10-1) while freezer drawer 154 is in the predetermined bounding zone 216 216. Two-dimensional image 11-2A illustrates a two-dimensional isolated image that has been generated (e.g., by controller 150 from two-dimensional image 11-1, 9-2, or 10-2A) to show an isolated first layer within which the first stored item 220, second stored item 222, and fourth stored item 226 are held. Two-dimensional image 11-2B illustrates a two-dimensional isolated image that has been generated (e.g., by controller 150 from two-dimensional image 11-1 or 10-2B) to show an isolated second layer within which the third stored item 224 is held. Two-dimensional image 11-2C illustrates a two-dimensional isolated image that has been generated (e.g., by controller 150 from two-dimensional image 11-1) to show an isolated second layer within which the fifth stored item 228 is held. Two-dimensional image 11-3 illustrates a two-dimensional expanded image that has been generated (e.g., by controller 150 from two-dimensional images 11-2A, 11-2B, and 11-2C) to show all of the stored items within freezer drawer 154 at image 11-1 (i.e., first stored item 220, second stored item 222, third stored item 224, fourth stored item 226, and fifth stored item 228) spaced apart from each other.

Returning generally to FIGS. 8 through 12, in certain embodiments, controller 150 may be configured to record a descriptor of the identified stored items (e.g., within an inventory tracking or recording stored items within refrigerator appliance 100). As an example, the descriptor may include a string of text naming or generally describing the corresponding stored item. As an additional or alternative example, the descriptor may include an image corresponding to the stored item. Such an image of the descriptor may be a captured two-dimensional image (or portion thereof) from camera 160 or a preloaded image received from another remote source (e.g., a remote server).

As illustrated in FIGS. 8 through 12, an expanded two-dimensional image may be generated showing the stored items spaced apart from each other such that a user may readily understand what stored items have been captured and recognized. Such expanded images may be generated using portions of the captured images at the camera 160 (e.g., wherein captured portions of the stored items are isolated from each other and transferred to the expanded image) or from separate preloaded images stored or received at the controller 150 (e.g., wherein preloaded images of similar items are received from a remote server, such as an Internet server, and transferred to the expanded image). The isolated or expanded two-dimensional images may be presented to a user (e.g., at mobile display 182) to provide an easy-to-understand view of items within refrigerator appliance 100. Optionally, such images may be presented with an internal location, such that a user may readily discern where a specific stored item is within fresh food chamber 122.

In additional or alternative embodiments, determination or selection of a specific layer may be recorded (e.g., with or as part of the descriptor) as a location for each stored item. In some such embodiments, the specific layer for each stored item may be based, at least in part, in the area of lower stored items that is covered by an upper stored item. For instance, as new stored items are placed within the freezer drawer 154, a determination may be made whether a stored item covers a minimum captured area (e.g., preset minimum threshold percentage) of a captured area of the objects in the previous layers. In other words, if a new stored item is determined to cover or obscure at least the minimum captured area of the total captured area of stored items within freezer drawer 154 (e.g., at an n$^{th}$ layer) prior to the new stored item's placement within freezer drawer 154, the new stored item may be determined to occupy a higher layer (e.g., an immediately higher or n$^{th}$+1 layer). Generally, the captured area corresponds to the area (e.g., in square millimeters or pixels) occupied by the stored objects within the freezer drawer 154 prior (e.g., immediately prior) to a new stored item being placed and detected within the freezer drawer 154. Such layers may further include or be distinguished by the relative positions of baskets 158A, 158B (e.g., upper basket 158B and lower basket 158A). Thus, any item identified in the upper basket 158B may be determined to be disposed in a higher layer than each item in the lower basket 158A.

In optional embodiments, the minimum captured area is a preset value of 20%. In other embodiments, the minimum captured area is a preset value of 30%. In further embodiments, the minimum captured area is a preset value of 40%.

Using FIG. 10 as an example, in captured image 10-1, the third stored item 224 is determined to be within the upper basket 158B while the first and second items have been identified (e.g., within the same image or a previous image) as being within the lower basket 158A (e.g., as determined from 9-1). Accordingly, the controller 150 may select a new, higher second layer in which the third stored item 224 is positioned. By contrast, the fourth stored item 226 is identified as being within the lower basket 158A (e.g., forward from the fiducial edge 212B of upper basket 158B) and does not cover any other stored items within the captured image of 10-1. Accordingly, the controller 150 may select the first layer in which the fourth stored item 226 is positioned.

Using FIG. 11 as a further example, in the captured image 11-1, the fifth stored item 228 is determined to cover at least the minimum captured area of the area defined by the third stored item 224 in the second layer. Accordingly, the controller 150 may select a new, higher third layer in which the fifth stored item 228 is positioned.

Figure 13:
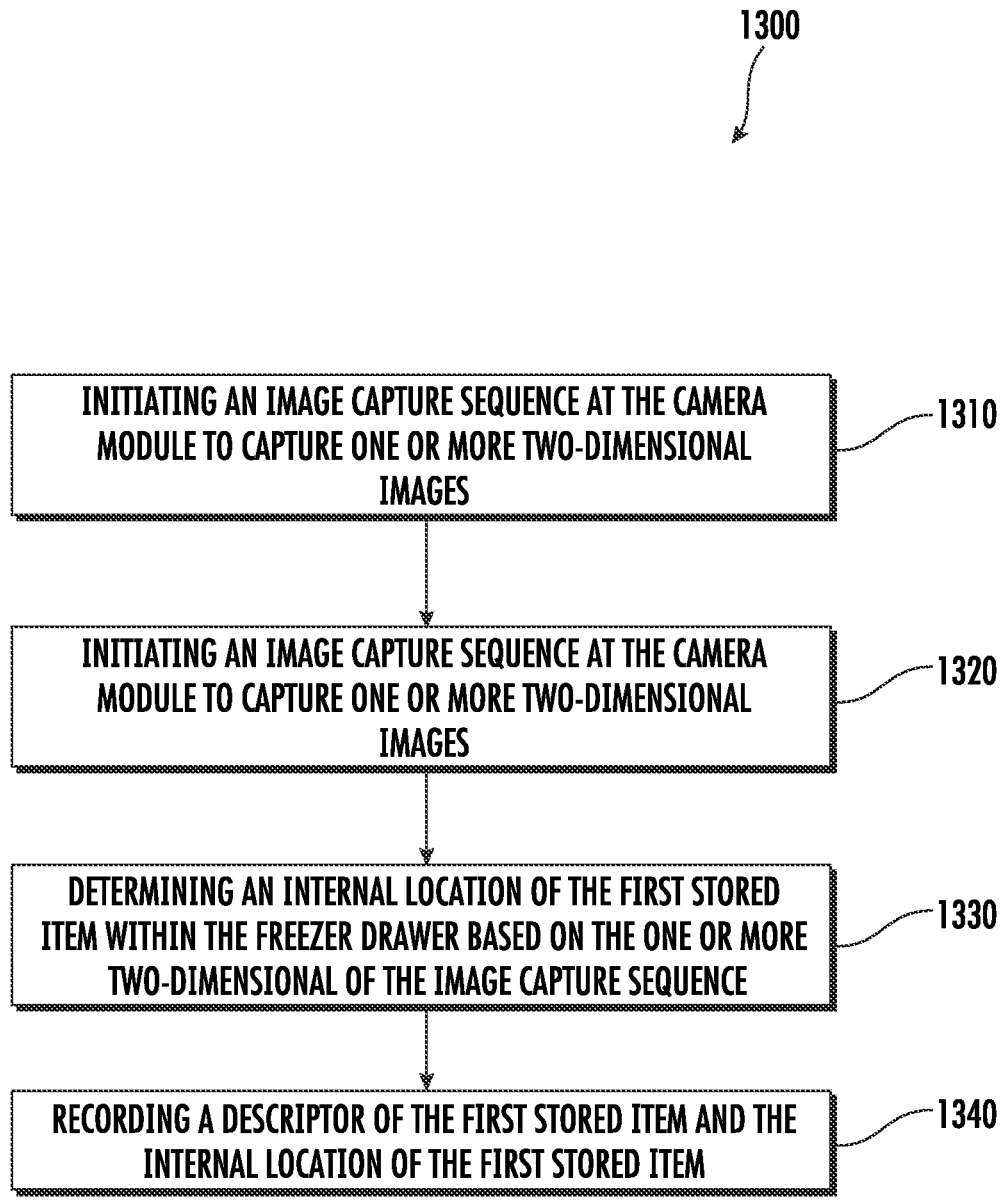
FIG. 13 provides a flow chart illustrating a method of operating a refrigerator appliance according to exemplary embodiments of the present disclosure.

Turning now to FIG. 13, a flow chart is provided of a method 1300 according to exemplary embodiments of the present disclosure. Generally, the method 1300 provide for methods of operating a refrigeration appliance 100 (FIG. 1) that includes a camera 160, as described above. The method 1300 can be performed, for instance, by the controller 150 (FIG. 3). For example, controller 150 may, as discussed, be in communication with camera 160, integrated display 180 (FIG. 3), or mobile display 182 (FIG. 3). During operations, controller 150 may send signals to and receive signals from camera(s) 160, integrated display 180, or mobile display 182. Controller 150 may further be in communication with other suitable components of the appliance 100 to facilitate operation of the appliance 100 generally.

FIG. 13 depicts steps performed in a particular order for purpose of illustration and discussion. Those of ordinary skill in the art, using the disclosures provided herein, will understand that the steps of any of the methods disclosed herein can be modified, adapted, rearranged, omitted, or expanded in various ways without deviating from the scope of the present disclosure (except as otherwise described).

At 1310, the method 1300 includes initiating an image capture sequence (e.g., first image capture sequence) at the camera module to capture one or more two-dimensional images. Thus, a first image capture sequence may include capturing a plurality of two-dimensional images (e.g., a first two-dimensional image, subsequent second two-dimensional image, etc.), such as within a video feed or a series of sequential static images (e.g., taken or captured according to a predetermined rate or condition). Upon being captured at the camera module, the two-dimensional images may be transmitted to the controller (e.g., as a data signal). One or more of the two-dimensional images may then be recorded (e.g., temporarily) for comparison or evaluation.

In certain embodiments, the first image capture sequence is initiated in response to detecting movement of the freezer drawer. Thus, recording or evaluating two-dimensional images from the camera module may be prevented until movement is detected.

As an example, movement may be detected at a camera module directed at the freezer drawer. Specifically, changes in light or pixels captured by the camera module may be detected (e.g., between multiple images captured over time) indicating the movement of one or more objects within the field of view of the camera module, as is generally understood. The movement may be detected prior to a door of the freezer drawer being fully opened. For instance, detected changes in light or pixels may indicate that the freezer door is being opened and that a user is intending/attempting to load or remove a stored item from the freezer chamber. As another example, movement may be detected in response to the freezer drawer reaching a predetermined bounding zone, as described above. As yet another example, movement may be detected in response to receiving a signal from a separate sensor, such as a switch selectively engaged with the door. Such switches are generally understood and may, for instance, simultaneously control activation of a light for illuminating the freezer chamber. Opening the freezer door may thus activate the light and transmit a signal indicating motion of the freezer drawer.

Optionally, the first image capture sequence may continue until one or more end conditions are met. As an example, an end condition may include expiration of a predetermined time period (e.g., span of time) following the start of a corresponding detection of movement. As another example, an end condition may include failure to detect further changes in sequential images of the first image capture sequence. In other words, the first image capture sequence may end after sequential images stop changing or detecting further movement. The end condition may specifically require a preset number or time period of unchanged sequential images. As yet another example, an end condition may include detecting closure of the freezer door. In other words, the first image capture sequence may end in response to the freezer door being moved to the closed position.

At 1320, the method 1300 includes identifying a first stored item based on a two-dimensional image of the first image capture sequence. In other words, using at least one two-dimensional image of the plurality of two-dimensional images captured at 1310, a first stored item (e.g., food item) may be recognized. The identification of 1320 may thus require the first stored item to pass beneath or within the field of view of the camera module, as described above. Thus, the first two-dimensional image may include at least a captured portion of the first stored item. Moreover, once captured, recognizing or identifying the first stored item may be performed by edge matching, divide-and-conquer search, greyscale matching, histograms of receptive field responses, or another suitable routine.

At 1330, the method 1300 includes determining an internal location of the first stored item within the freezer chamber. The internal location of the first stored item may be based, at least in part, on a two-dimensional image of the first image capture sequence (e.g., the same first image as 1320 or, alternatively, a subsequent second image). For instance, a second two-dimensional image of the first image capture sequence may be captured subsequent to the first two-dimensional image of the first image capture sequence. In other words, using at least one two-dimensional image of the plurality of two-dimensional images captured at 1320, the internal location of the first stored item (e.g., location within the chilled chamber that a user has placed the first stored item) may be determined.

In some embodiments, the internal location includes an X-Y coordinate of the first stored item within the freezer drawer. As described above, a coordinate system (e.g., horizontal coordinate system) of the freezer chamber may be generated or identified based on identification of a fiducial region of the freezer drawer, which may serve as a reference for the coordinate system. Thus, 1330 may include identifying a fiducial region of the freezer drawer, and determining the X-Y coordinate of the first stored item with respect to the fiducial region.

In additional or alternative embodiments, the internal location includes a particular basket or height of the freezer drawer. For instance, 1330 may include identifying an upper basket (e.g., by a identifying a corresponding fiducial region or upper basket within a predetermined bounding zone). Based on such identification, a Z-axis vertical depth of the first stored item may be determined (e.g., at least in part). For instance, it may be determined that a first item has been placed within the lower basket (e.g., based on the first item being located forward or further from freezer chamber than a fiducial edge of the upper basket) or, alternately, within the upper basket (e.g., based on the first item being located rearward or closer to freezer chamber than a fiducial edge of the upper basket). Optionally, the internal location may include a specific layer (e.g., first vertical layer) within the freezer, as described above.

At 1340, the method 1300 includes recording a descriptor of the first stored item and the internal location of the first stored item. Thus, the controller may provide both a descriptor and internal location of the first stored item (e.g., within the inventory that is recorded on controller). As described above, the descriptor may include text or an image. In optional embodiments, the descriptor of the first stored item includes at least a portion of the first two-dimensional image of the first image capture sequence. In alternative embodiments, the descriptor of the first stored item includes a received two-dimensional image captured separately from the refrigerator appliance (e.g., downloaded to the controller from a remote server). Thus, if the first stored item would be difficult for a user to visually distinguish in the first two-dimensional image, a separate image (e.g., preloaded image) may be presented of a substantially identical item.

As would be understood in light of the present disclosure, one or more of the above steps may be repeated (e.g., with subsequent image capture sequences), such as to determine that a stored item has been removed from or otherwise relocated within the freezer drawer.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A refrigerator appliance comprising:
a cabinet defining a freezer chamber;
a freezer drawer slidably mounted to the cabinet at the freezer chamber, the freezer drawer comprising
 a drawer body selectively received within the freezer chamber,
 a freezer door coupled to the drawer body to move therewith and provide selective access to the freezer chamber,
 a lower basket, and
 an upper basket movably mounted to the drawer body above the lower basket;
a camera module attached to the cabinet and directed toward the freezer chamber; and
a controller operably coupled to the camera module, the controller being configured to initiate an operation routine comprising
 initiating an image capture sequence at the camera module to capture one or more two-dimensional images,
 identifying a first stored item based on the one or more two-dimensional images of the image capture sequence,
 determining an internal location of the first stored item within the freezer drawer based on the one or more two-dimensional images of the image capture sequence, and
 recording a descriptor of the first stored item and the internal location of the first stored item,
wherein determining the internal location of the first stored item comprises
 identifying the upper basket, and
 determining a Z-axis vertical depth of the first stored item based on identification of the upper basket.

2. The refrigerator appliance of claim 1, wherein the internal location comprises an X-Y coordinate of the first stored item within the freezer drawer.

3. The refrigerator appliance of claim 2, wherein determining the internal location of the first stored item comprises
 identifying a fiducial region of the freezer drawer, and
 determining the X-Y coordinate of the first stored item with respect to the fiducial region.

4. The refrigerator appliance of claim 1, wherein the descriptor of the first stored item comprises at least a portion of a two-dimensional image of the image capture sequence.

5. The refrigerator appliance of claim 1, wherein the internal location of the first stored item comprises a first vertical layer within the freezer drawer.

6. The refrigerator appliance of claim 1, wherein the camera module is mounted directly to the cabinet at a fixed location relative to the cabinet.

7. The refrigerator appliance of claim 1, wherein the camera module is mounted to the freezer door to move therewith.

8. The refrigerator appliance of claim 1, wherein the cabinet further defines a chilled chamber above the freezer chamber, wherein the refrigerator appliance further comprises a refrigerator door rotatably hinged to the cabinet to provide selective access to the chilled chamber, and wherein the camera module is mounted to the refrigerator door to move therewith.

9. A method of operating a refrigerator appliance comprising a freezer drawer and a camera module directed at the freezer drawer, the method comprising:

initiating an image capture sequence at the camera module to capture one or more two-dimensional images;

identifying a first stored item based on the one or more two-dimensional images of the image capture sequence;

determining an internal location of the first stored item within the freezer drawer based on the one or more two-dimensional images of the image capture sequence; and recording a descriptor of the first stored item and the internal location of the first stored item, wherein the freezer drawer comprises a lower basket and an upper basket movably mounted above the lower basket, and wherein determining the internal location of the first stored item comprises
identifying the upper basket, and
determining a Z-axis vertical depth of the first stored item based on identification of the upper basket.

10. The method of claim 9, wherein the internal location comprises an X-Y coordinate of the first stored item within the freezer drawer.

11. The method of claim 10, wherein determining the internal location of the first stored item comprises
identifying a fiducial region of the freezer drawer, and
determining the X-Y coordinate of the first stored item with respect to the fiducial region.

12. The method of claim 9, wherein the descriptor of the first stored item comprises at least a portion of a two-dimensional image of the image capture sequence.

13. The method of claim 9, wherein the internal location of the first stored item comprises a first vertical layer within the freezer drawer.

14. The method of claim 9, wherein the camera module is mounted directly to a cabinet at a fixed location relative to the cabinet.

15. The method of claim 9, wherein the camera module is mounted to a freezer door of the freezer drawer to move with the freezer door.

16. The method of claim 9, wherein a cabinet defines a chilled chamber above a freezer chamber, wherein the refrigerator appliance further comprises a refrigerator door rotatably hinged to the cabinet to provide selective access to the chilled chamber, and wherein the camera module is mounted to the refrigerator door to move therewith.

17. A refrigerator appliance comprising:
a cabinet defining a freezer chamber;
a freezer drawer slidably mounted to the cabinet at the freezer chamber, the freezer drawer comprising
a drawer body selectively received within the freezer chamber,
a freezer door coupled to the drawer body to move therewith and provide selective access to the freezer chamber,
a lower basket, and
an upper basket movably mounted to the drawer body above the lower basket;
a camera module attached to the cabinet and directed toward the freezer chamber; and
a controller operably coupled to the camera module, the controller being configured to initiate an operation routine comprising
initiating an image capture sequence at the camera module to capture one or more two-dimensional images,
identifying a first stored item based on the one or more two-dimensional images of the image capture sequence,
determining an internal location of the first stored item within the freezer drawer based on the one or more two-dimensional images of the image capture sequence, and
recording a descriptor of the first stored item and the internal location of the first stored item,
wherein the internal location comprises an X-Y-Z coordinate of the first stored item within the freezer drawer,
wherein determining the internal location of the first stored item comprises
identifying a fiducial region at an edge of the freezer drawer,
determining the X-Y coordinate of the first stored item with respect to the fiducial region,
identifying the upper basket, and
determining a Z-axis vertical depth of the first stored item based on identification of the upper basket.

18. The refrigerator appliance of claim 17, wherein the internal location of the first stored item comprises a first vertical layer within the freezer drawer.

19. The refrigerator appliance of claim 17, wherein the edge is an inner edge of the drawer body.

* * * * *